United States Patent [19]

George et al.

[11] 3,890,130

[45] June 17, 1975

[54] CHEMICAL TOPPING OF *BRASSICA OLERECEA*

[75] Inventors: Edwin Francis George, Eversley; Alan John Davidson, Wokingham, both of England

[73] Assignee: Imperial Chemical Industries Limited, London, England

[22] Filed: Jan. 3, 1974

[21] Appl. No.: 430,420

Related U.S. Application Data

[63] Continuation of Ser. No. 142,371, May 11, 1971, abandoned.

[30] Foreign Application Priority Data

May 22, 1970 United Kingdom............... 24826/70
July 6, 1970 United Kingdom............... 32672/70

[52] U.S. Cl. ........................... 71/76; 71/78; 71/88; 71/94; 71/111
[51] Int. Cl.².......................................... A01N 9/20
[58] Field of Search ................. 71/115, 111, 76, 78

[56] References Cited

UNITED STATES PATENTS

| | | | |
|---|---|---|---|
| 2,523,227 | 9/1950 | Mullison | 71/111 |
| 3,326,664 | 6/1967 | Tso | 71/78 |
| 3,403,994 | 10/1968 | Olin | 71/118 |
| 3,475,155 | 10/1969 | Ishida et al. | 71/76 |
| 3,617,245 | 11/1971 | Ishida et al. | 71/76 |

FOREIGN PATENTS OR APPLICATIONS 789,445 1/1958 United Kingdom................... 71/111

*Primary Examiner*—Glennon H. Hollrah
*Attorney, Agent, or Firm*—Cushman, Darby & Cushman

[57] ABSTRACT

Increasing the yield of brussels sprouts and sprouting broccoli by spraying with 2(m-chlorophenylcarbomoyloxy)propionic acid or derivatives thereof.

2 Claims, No Drawings

CHEMICAL TOPPING OF *BRASSICA OLERECEA*

This is a continuation of application Ser. No. 142,371, filed May 11, 1971, now abandoned.

This invention relates to methods of regulating the growth of plants, and in particular to regulating the growth of Brussels sprouts and sprouting broccoli plants.

At the present time, it is increasingly the practice when growing Brussels sprouts, particularly those for example which are intended for storage and sale in a frozen condition, to harvest the whole plant, rather than to make several pickings of the sprouts as they become mature. In order to obtain sprouts of a more uniform size at harvest, the main apex of the plants is removed manually some time previously, so that the immature sprouts on the upper part of the stem are stimulated to grow. In a similar way, the axillary buds of annual sprouting broccoli (calabrese) plants are stimulated to produce lateral flowering shoots by removing the main apex. These manual operations, generally referred to as 'hand stopping', are time consuming and laborious.

The present invention provides a method of stimulating the growth of immature sprouts on the upper part of the stem of Brussels sprouts plants and of stimulating the production of lateral flowering shoots from the axillary buds of sprouting broccoli plants, which comprises the foliar application to the plants of a compound of the formula:

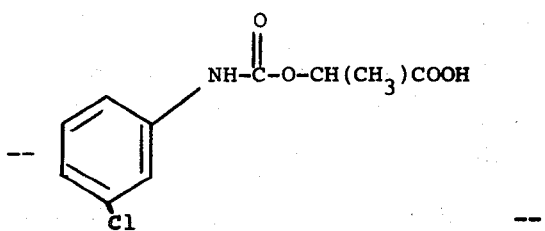

or a salt, amide or nitrile thereof, in an amount sufficient to inhibit selectively the growth of the main apex in the plant but insufficient to cause substantial phytotoxic damage to other parts of the plants.

Suitable salts for use in the method of the invention include, for example, alkali metal and alkaline earth metal salts, for example, sodium, potassium, or calcium salts, the ammonium salt, or salts with organic bases, for example, mono-, di or tri-alkylamines, for example such amines wherein the one, two or three alkyl radicals contain up to 4 carbon atoms. Examples of such amines include methylamine, diethylamine, or triethylamine, and saturated heterocyclic amines, for example, piperidine or morpholine. Substituted alkylamines, for example diethanolamine, are also suitable.

In view of the fact that the compound of the foregoing formula is a member of a class of compounds claimed as herbicides in U.K. Pat. Specification No. 789,445, it is surprising that the growth of the main apex in Brussels sprouts plants and sprouting broccoli plants can be inhibited selectively, without adversely affecting the growth of the sprouts on the upper part of the stem of the Brussels sprouts plants, or the growth of the lateral flowering shoots in the broccoli plants. The selective effect is the more surprising in that this compound is believed to be systemic in its action, that is to say, that it is translocated from a part of the plant to which it is applied to other, untreated, parts of the plant.

Generally the rate at which the compound of the foregoing formula, or derivative thereof, is applied to Brussels sprouts or sprouting broccoli plants, is from 0.25 to 5 pounds per acre, calculated as the free acid. A particularly preferred rate of application is 0.5 pounds per acre. The optimum rate is however found to vary quite markedly with the variety of Brussels sprout or broccoli plant treated (as illustrated in Example 4 hereinafter), with the period between treatment and harvest, and to some extent with the nature of the derivative employed. In some cases rates of application as low as 1 lb/acre may be found to produce sufficient chlorosis overall to nullify the beneficial effect of killing the apex; while in others the optimum rate of application is found to be 1.5 lbs/acre or higher. It is therefore desirable to do test experiments with each variety treated to discover the most suitable timing and rates of application. However, as a general guide to the behaviour of Brussels sprouts varieties, it is found that early dwarf hybrids and mid-season varieties respond most effectively to treatment, the former typically requiring a treatment rate of 0.25–0.5 lbs/acre, and the latter a treatment rate of 0.5 to 1 lb/acre.

As indicated above, the optimum timing of the treatment has to be determined by experiment in each case. Hand stopping is generally carried out five or six weeks before harvest. The treatment of the present invention may give useful results if carried out at the same time, but it is often found that it is better to apply the spray 10–14 days earlier.

The compound or its derivatives are conveniently applied by spraying as solutions or dispersions in water. Preferably such solutions or dispersions contain surface-active agents.

The surface-active agents may be of the cationic, anionic or non-ionic type. Suitable agents of the cationic type include, for example, quaternary ammonium compounds, for example cetyl trimethyl ammonium bromide. Suitable agents of the anionic type include, for example, soaps; salts of aliphatic mono esters of sulphuric acid, for example sodium lauryl sulphate; and salts of sulphonated aromatic compounds, for example sodium dodecylbenzenesulphonate, sodium, calcium, and ammonium lignosulphonate, butylnaphthalenesulphonate, and a mixture of the sodium salts of diisopropyl- and triisopropyl- naphthalenesulphonic acid. Suitable agents of the non-ionic type include, for example, the condensation products of ethylene oxide with fatty alcohols such as oleyl alcohol and cetyl alcohol, or with alkyl phenols such as octylphenol, nonylphenol and octylcresol. Other non-ionic agents are the partial esters derived from long chain fatty acids, and hexitol anhydrides, for example sorbitan monolaurate; the condensation products of the said partial esters with ethylene oxides; and the lecithins.

The invention is illustrated by the following Examples, in which concentrations and rates per acre are given throughout in terms of free acid.

EXAMPLE 1

Brussels sprouts plants approximately 24 inches tall are sprayed with an aqueous solution containing 0.05% w/v of 2 (m-chlorophenylcarbamoyloxy) propionic acid and 0.1% of a surface active agent sold under the name of "Lissapol" NX (Lissapol is a Registered Trade Mark). The plants are harvested 6 weeks later and a substantially increased yield of Brussels sprouts of marketable size is obtained compared with untreated plants harvested at the same time.

EXAMPLE 2

Young sprouting broccoli plants were sprayed with an aqueous solution containing 0.05% w/v of 2-m-chlorophenylcarbamoyloxy propionic acid and 0.1% of a surface-active agent sold under the name of Lissapol NX. Subsequently the growth of the main apex of the plants was found to have been arrested and the axillary buds stimulated into growth.

EXAMPLE 3

Brussels sprout plants, variety Jade Cross, were sprayed overall with aqueous formulations of 2-m-chlorophenylcarbamoyloxypropionic acid, potassium salt, as a 0.05% w/v solution containing 0.1% Lissapol NX. Rates, times of application and yields relative to controls are shown in Table 1 below.

| Treatment (rate of application, lbs/acre) | Days between treatment and harvest | Yield of Sprouts (tons/acre) | |
|---|---|---|---|
| | | Total | Medium Grade |
| 0.17 | 43 | 5.17 | 4.87 |
| 0.25 | 36 | 5.11 | 4.61 |
| 0.32 | 43 | 6.56 | 6.01 |
| 0.64 | 43 | 7.04 | 6.42 |
| 0.64 | 36 | 6.32 | 5.95 |
| 1.0 | 36 | 4.23* | 3.88* |
| Hand stopped | 36 | 6.81 | 5.87 |
| Control(untreated) | | 4.96 | 4.67 |

*Plants severely chlorotic

These experiments indicate the optimum timing and application rates for use with this variety. It will be seen that an application rate of 1 lb per acre 36 days before harvest has too great a phytotoxic effect to be useful in the present invention. Note that in favourable circumstances it was possible to obtain a higher yield of medium grade sprouts (which are the most suitable for freezing) by chemical application than by hand stopping.

EXAMPLE 4

Five varieties of Brussels sprouts were sprayed with an aqueous solution of the potassium salt of 2-m-chlorophenylcarbamoyloxypropionic acid with 0.1% 'Agral' 90 wetter, at a variety of rates. After 46 days the mean diameter of the upper sprouts on the stem were measured. Results are shown in Table II below.

| Rate of application of chemical (lbs/acre) | 0 | ¼ | ½ | 1 | 1½ | 2 |
|---|---|---|---|---|---|---|
| Variety | Mean diameter of upper sprouts (mm) | | | | | |
| Sanda | 8.0 | 8.2 | 14.5 | 11.7 | 21.1 | 16.7 |
| Seven Hills | 8.7 | 8.5 | 10.5 | 9.9 | 15.3 | 13.5 |
| Stiekema | 10.7 | 14.7 | 14.3 | 14.7 | 20.9 | 18.9 |
| Tribune | 9.1 | 7.7 | 14.2 | 16.9 | 15.6 | 21.5 |
| Jade Cross | 18.1 | 24.7 | 24.3 | 21.7 | 26.7 | 22.9 |

EXAMPLE 5

Example 3 was repeated, using different periods between treatment and harvest. Results are shown in Table III

| Treatment (Rate of application lbs/acre.) | Days between treatment and harvest | Yield of Sprouts (tons/acre) | |
|---|---|---|---|
| | | Total | Medium Grade |
| 0.17 | 50 | 6.68 | 6.17 |
| 0.25 | 43 | 8.09 | 7.13 |
| 0.32 | 50 | 8.98 | 7.61 |
| 0.5 | 43 | 7.12 | 6.41 |
| 0.64 | 50 | 8.66 | 7.04 |
| 0.64 | 43 | 7.95 | 6.48 |
| 1.0 | 43 | 5.77 | 5.15 |
| Hand stopped | 43 | 9.46 | 7.45 |
| Control (untreated) | | 5.48 | 5.48 |

When Examples 3 and 5 are repeated using the ethyl ester of 2-(m-chlorophenylcarbamoyloxy) propionic acid instead of the free acid, similar results are obtained.

EXAMPLE 6

Plants of annual sprouting broccoli (calabrese) were transplanted singly into 4 inch diameter pots containing a peat/sand rooting medium. When their stem length had reached approximately 6.5 cm., the plants were divided into 5 batches of 4 plants. The batches were treated in the following way:
1. 2(m-chlorophenylcarbamoyloxy)propionic acid sprayed onto the plants at a rate equivalent to 2 kg/ha.
2. 2(m-chlorophenylcarbamoyloxy)propionic acid sprayed at 1 kg/ha.
3. 2(m-chlorophenylcarbamoyloxy)propionic acid, potassium salt sprayed at 2 kg/ha.
4. 2(m-chlorophenylcarbamoyloxy)propionic acid, potassium salt sprayed at 1 kg/ha.
5. Plants untreated-controls The free acid treatments 1 and 2 were prepared by dissolving the appropriate weight of compound in a little acetone and adding the acetone solution to deionized water to which Lissapol NX had been added. The solution was made up to volume when the concentration of Lissapol NX was 0.1%.

The potassium salt treatments 3 and 4 were prepared by dissolving the chemical in water to which sufficient Lissapol NX was added for the concentration in the final volume to be 0.1%.

The stem length of each plant was measured immediately before commencing the experiment and then again after 6 and 16 days. Results are shown in Table IV.

Table IV

| Treatment | Mean Stem Growth | |
|---|---|---|
| | After 6 days mm | 16 days after treatment mm |
| 1 | 13.5 | 27.3 |
| 2 | 16.8 | 50.0 |
| 3 | 14.5 | 24.8 |
| 4 | 17.5 | 51.3 |
| 5 | 28.8 | 85.0 |

The length of all the lateral side shoots which developed on the plants was measured 16 days after treatment with the results shown in Table V.

TABLE V

| Treatment | Mean length of side shoots mm. |
|---|---|
| 1 | 82.5 |
| 2 | 24.0 |
| 3 | 46.0 |
| 4 | 49.5 |
| 5 | 5.5 |

As a result of decreasing the stem growth of the plants by the method of the invention, apical dominance was reduced and the number of lateral branches increased.

The systematic names of Brussels sprouts and calabrese are *Brassica oleracea gemmifera* and *Brassica oleracea botrytis* respectively, Lissapol NX is a condensate of 1 mole of nonyl phenol with 8 moles of ethylene oxide. Agral 90 comprises 90% by volume Lissapol NX and 10% alcohol.

We claim:

1. A method of stimulating the growth of immature sprouts on the upper part of the stem of Brussels sprouts plants which comprises the foliar application to the plants of 2-m-chlorophenyl-carbamoyloxypropionic acid or a salt thereof in an amount sufficient to inhibit selectively the growth of the main apex in the plants but insufficient to cause substantial phytotoxic damage to other parts of the plants, said application being from 5 to 8 weeks prior to harvest and said salt being an alkali metal, alkaline earth metal, ammonium or alkyl amine salt wherein the alkyl contains up to 4 carbon atoms.

2. A method of stimulating the production of lateral flowering shoots from the axillary buds of sprouting broccoli plants, which comprises the foliar application to the plants of 2-m-chlorophenylcarbamoyloxypropionic acid or a salt thereof in an amount sufficient to inhibit selectively the growth of the main apex in the plants but insufficient to cause substantial phytotoxic damage to other parts of the plants, said application being from 5 to 8 weeks prior to harvest and said salt being an alkali metal, alkaline earth metal, ammonium or alkyl amine salt wherein the alkyl contains up to 4 carbon atoms.

* * * * *